United States Patent [19]

Voet

[11] Patent Number: 5,204,596

[45] Date of Patent: Apr. 20, 1993

[54] DEVICE HAVING A MULTIPHASE LOAD, A STATIC CONVERTER AND INDUCTANCE COILS

[75] Inventor: Eduard J. Voet, Carasso, Switzerland

[73] Assignee: Europe Patent Ltd., Carasso, Switzerland

[21] Appl. No.: 582,965

[22] PCT Filed: Jan. 30, 1990

[86] PCT No.: PCT/CH90/00021
§ 371 Date: Oct. 17, 1990
§ 102(e) Date: Oct. 17, 1990

[87] PCT Pub. No.: WO90/09695
PCT Pub. Date: Aug. 23, 1990

[51] Int. Cl.[5] .............................................. H02P 1/44
[52] U.S. Cl. .................................. 318/523; 318/795; 318/254; 363/43
[58] Field of Search ............... 318/795, 794, 796, 817, 318/439, 523, 531, 254; 310/90.5; 363/43, 98

[56] References Cited

U.S. PATENT DOCUMENTS

| 3,440,516 | 4/1969 | Kaiser. | |
|---|---|---|---|
| 3,875,484 | 4/1975 | Williams et al. | 318/817 |
| 4,096,420 | 6/1978 | Gosling et al. | 318/439 |
| 4,245,869 | 1/1981 | Scheffer et al. | 310/90.5 |
| 4,808,868 | 2/1989 | Roberts | 318/795 |

FOREIGN PATENT DOCUMENTS 3525877 1/1986 Fed. Rep. of Germany.
775842 10/1980 U.S.S.R..

Primary Examiner—William M. Shoop, Jr.
Assistant Examiner—John W. Cabeca
Attorney, Agent, or Firm—Egli International

[57] ABSTRACT

A device having inductance coils which are each allocated to one phase and which are wound around a common magnetic core in the same direction and with the same number of windings. One of each of the inductance coils is connected to one of each of the phase leads for supplying the multi-phase load, the connection being made in series between the converter and the load. The load can particularly be a multi-phase asynchronous or synchronous motor.

7 Claims, 1 Drawing Sheet it is known from SU-680107 to balance, by means of transformer-like action, the burden on a power supply network caused by pulses from a three-phase rectifier by means of coils wound around a common core.

DEVICE HAVING A MULTIPHASE LOAD, A STATIC CONVERTER AND INDUCTANCE COILS

BACKGROUND OF THE INVENTION

1. Field of the Invention

The invention relates to a device comprising a multiphase load and a static converter with a multiphase output for supplying the load, as well as inductance coils which are each allocated to a phase and wound in the same direction and with the same number of windings on a common magnetic core to form a closed magnetic circuit.

Such a device may, for example, be used for operating a multiphase asynchronous motor as load, i.e. as a driving means. Basically, such a device may also be used with loads comprising inductive energy storage means, such as longer connective leads, with magnetic vibrators, piezoelectric resonators and the like.

2. Discussion of the Prior Art

In a driving means with a multiphase asynchronous motor as load, the burden on the driving means' components during operation at particularly high revolutions is basically impaired by the deficiencies in the electromagnetic symmetry of the asynchronous motor and/or the converter's connected semiconductor output stages. This was not of importance as long as the above mentioned high revolutions and the respective dynamic ratio were not required and, in addition to this, there was no necessity for creating the prerequisites for high-performance bearing of the motor's shaft, in particular by magnetic bearing. Present high-speed drive technology makes increased demands on the dynamics of the driving means, which no longer allows magnetic forces to act vertically on the shaft. Therefrom a completely different and new behaviour on the part of the asynchronous motor's rotor arises, in particular concerning its dynamics, critical speed and bearing stresses. Such a driving means is, for example, known for the patent application PCT/CH89/00188.

The same applies to the other loads mentioned above, i.e. loads with inductive energy storage means, such as longer connective leads, with magnetic vibrators, piezoelectric resonators and the like.

The converter output of such a device, in particular of such a driving means, is sensitive to high electrical spikes of a high frequency. Consequently the converter's reliability has to be maintained, in particular in highly dynamical operating modes with highly saturated loads, i.e. when the energy requirements and the direction of the energy flow (acceleration and breaking) change rapidly with the respective burden on the converter's recovery diode caused by switching processes. The respective presently known safety measures are not adequate for protecting the converter's semiconductor output stages. Furthermore, they generate electrical losses and thus reduce the efficiency of the device, or the driving means respectively.

Additionally, deficiencies in the load's and the converter's electromagnetic symmetry cause a burden on the load's support. The device must be able to cope with and overcome the forces and irregularities caused by this burden, whereby critical frequencies are not dampened and filtered out. In a driving means with a multiphase asynchronous motor as load, the deficiencies in the electromagnetic symmetry of the asynchronous motor and the converter constitute a burden for the asynchronous motor's bearing. The forces and irregularities caused by this burden must be borne by the bearing and must be overcome by the driving means' components, whereby critical speeds are not dampened or filtered out. From filtering technology and, for example, from EP-0300872 it is known to suppress interference arising in the phase leads, which occurs in a three-phase power supply in form of spikes, by means of coils which are wound in one direction around a single-aperture core. In this context the use of a single-aperture core for high frequencies or a U-I-lamella core is known, for example, from JP-54-144851.

SUMMARY OF THE INVENTION

Additionally, in the high performance field it is known from SU-680107 to balance, by means of transformer-like action, the burden on a power supply network caused by pulses from a three-phase rectifier by means of coils wound around a common core.

Such a technology has, however, not been applied to the present day to a multiphase supply of a load which is frequency-controlled by an converter. In particular this technology has not been used yet for the multiphase supply of an asynchronous motor, frequency-controlled by means of an converter, for the purpose of its symmetrical magnetisation. In presently available power ranges such an application was not necessary, as deficiencies in the electromagnetic symmetry of the multiphase asynchronous motor and/or converter could be disregarded with regard to presently achievable speeds and dynamics: the asymmetrical forces are negligible at the small speeds and the low dynamics of the driving means. This changes when moving to high-speed drives to square power of the asynchronous motor's rotating speed. The same applies to the dynamics. In converters connected in series spikes were intercepted until now by additional circuit elements contained in the converter, such as diodes, resistors and capacitors included in known protective circuits suitable for this purpose (snubber-networks).

It is the object of the invention to increase the dynamics, the reliability, and the efficiency of the above mentioned device, in particular when said device concerns a driving means. Amongst other things, the failure rate caused by malfunctions is to be reduced in that it is prevented that spikes and deficiencies in the electromagnetic symmetry of the multiphase load and/or the connected semiconductor elements of the converter's output stage impair the reliability.

For the purpose of solving this problem the device of the above mentioned kind is characterized in that each one of the inductance coils is connected with one each of the phase leads for supplying the load, the connection being made in series between the converter and the load.

In order to balance deficiencies in the electromagnetic symmetry of the multiphase load and/or the converter's connected semiconductor output stage by means of transformer-like action, the inductance coils and the magnetic core may be preferably dimensioned equivalent to a power supply transformer adjusted to the frequency and rating of the converter. These measures result in a balancing of the magnetic field in the connected multiphase load. If such a load concerns a multiphase asynchronous motor, its bearings are relieved during the highly dynamical operation with a highly saturated asynchronous motor, which allows operating the asynchronous motor with increased dynamics. The advantage lies in the fact that there is a reduction in the noise level caused by the asynchronous motor's running noises and a dampening of the critical speeds, particularly where multipolar motors with, for example, 4 or more poles are used.

Generally speaking, the balancing transformation may take place between the phases with a transformer rating which is equivalent to about one third of the output power supplied to the load. Additionally, a three-phase or four-phase asynchronous motor known from the patent application PCT/CH89/00188 can be used as load. Together these motors form a motor system in which the motors have the same maximum torque. Characteristic values for the line voltage and the operating frequency, on the other hand, differ amongst each other, each of which is the element of a geometric series formed by $\sqrt{3}$ or $\sqrt{2}$ as ratio, so that the motors of such a motor system formed by the ratios 29 3 or $\sqrt{2}$ are adjusted to each other. If the load is one of the motors of this motor system, this results in the fact that the balancing transformer which matches such a motor is, with regard to its windings, also one of the elements of a geometrical series formed by 29 3 or $\sqrt{2}$ as ratio. In other words, a pertinent system of balancing transformers matches the motor system in accordance with the patent application PCT/CH89/00188, so that the balancing transformers of such a system of balancing transformers are dimensioned with the same ratio $\sqrt{3}$ as a formation rule as the pertinent motors of the motor system under the patent application PCT/CH89/00188.

In order to remove the converter's spikes on the respective phase of the supply, the inductance coils and the magnetic core must preferably be dimensioned equivalent to a mains filter adjusted to the frequency and rating of these spikes, whereby every inductance coil comprises a middle terminal which is connected via a capacitor with the converter's reference terminal leading to a reference pole of the converter's internal DC power supply, so that spikes are transformed at a ratio of $-1:1$ and the transformed spikes are fed to the reference terminal. The advantage therein is that the removal of the spikes from the connected semiconductor output stages takes place by means of transformer-like action. Furthermore, each inductance coil can preferably be connected in parallel with a further capacitor, in order to adjust the inductance coil's resonant frequency, which allows, during commutation, to adjust the leading edge rates of the transformed spikes. These measures result in a decrease of the voltage amplitudes in the disturbing frequency spectrum by moving them to a lower frequency range and by reducing the spikes' edge steepness. The advantage of reduced acoustic stress caused by the converter's switching noises must be pointed out. Furthermore, the reduced strain on the electronic components of the device according to the invention increases their reliability.

Additionally, a further coil may preferably be placed on the magnetic core, which may be used as the secondary of a supply transformer. The advantage consists of the fact that when a multiphase asynchronous motor is used, the converter's emergency power supply is gained, in the event that the power supply is interrupted, from electric power derived by braking the load (i.e. via an insulating transformer), as is, for example, known from the driving means mentioned above and disclosed in patent application PCT/CH89/00188. Thus the necessity of a separate transformer is avoided.

The inductance coils and the magnetic core may also be constructed as a combined unit of balancing and spike transformers, whereby the spike transformer uses only a small proportion of the balancing transformer's windings for connecting the capacitor. The input side of the combined unit connected to capacitors is connected with the converter's semiconductor output stages. It is sensible to compromise between the two options, i.e. the optimum embodiment equivalent to a power supply transformer adjusted to the frequency and rating of the converter, and the optimum embodiment equivalent to a mains filter adjusted to the frequency and rating of the spikes. The inductance coils and the magnetic core cooperate as a filter which is able to automatically distinguish between an converter's commutating and live phase. During the commutating phase the impedance coils' reactive impedances prevail, whereas during the live phase they compensate each other and counterbalance each other's effect in the event that the total of the currents is equal to zero. Additionally, in static converters the operating frequency and the commutating frequency has a ratio of 1:1000. As in the arrangement of inductance coils and magnetic core as a combined unit of a balancing and spike transformer at least three windings, due to manufacturing reasons, have to be used for the spike transformer, winding ratios arise which are only 1:20 to 1:50. Thus inductance is always sufficiently large for the spike transformation.

BRIEF DESCRIPTION OF THE DRAWING

In the following, an exemplary embodiment of the invention is described with reference to the drawings.

DETAILED DESCRIPTION OF THE PREFERRED EMBODIMENTS

The invention is described in the following, based on an example which consists of a three-phase embodiment of the device according to the invention where the load is constructed as a three-phase asynchronous motor. In must be understood that this three-phase driving means is an example and that the device according to the invention may also be used with other multiphase, in particular four- and six- phase, embodiments of the load: thus all components like terminals, leads, coils, capacitors etc., which are to be found and described either three times or six times below in context with a three-phase embodiment of the asynchronous motor, are to be found in a multiphase embodiment of the load in the respective number, e.g. in context with a four-phase embodiment of the load either four or eight times.

Figure 1:
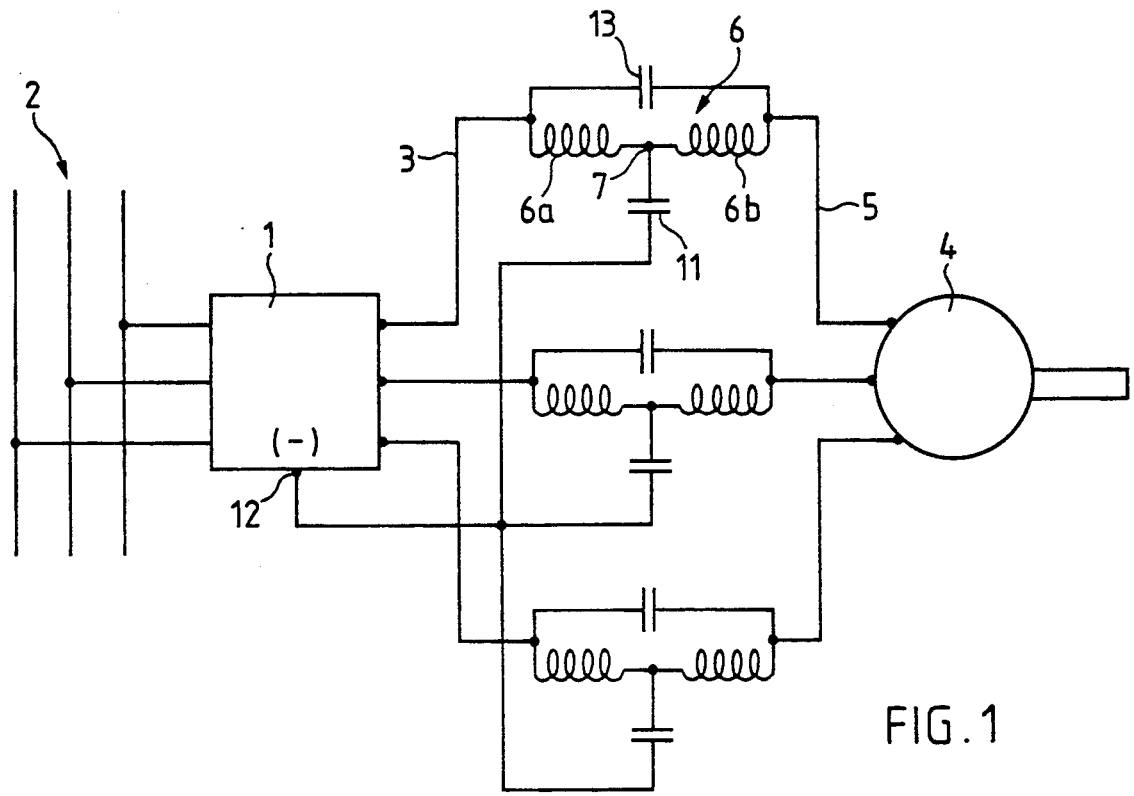
FIG. 1 shows a circuit diagram of an embodiment of the device according to the invention based on an example in which the load consists of a multiphase asynchronous motor and the device is a driving means.

In the circuit diagram of FIG. 1 there is designated with 1 a converter of the kind disclosed in the patent application PCT/CH89/00188, which is fed by a three-phase mains 2 and which supplies through output leads 3 three-phase current for supplying a three-phase asynchronous motor 4 via connecting leads 5.

Each one of the output leads 3 is connected with the respective connecting lead 5 via the respective inductance coil 6. Inductance coil 6 is constructed in two parts and comprises a central terminal 7 between the two parts 6a, 6b of the inductance coil 6.

Thus each inductance coil 6 within the respective phase lead 5 of the power supply of asynchronous motor 4 is connected in series between the converter 1 and the asynchronous motor 4.

Figure 2:
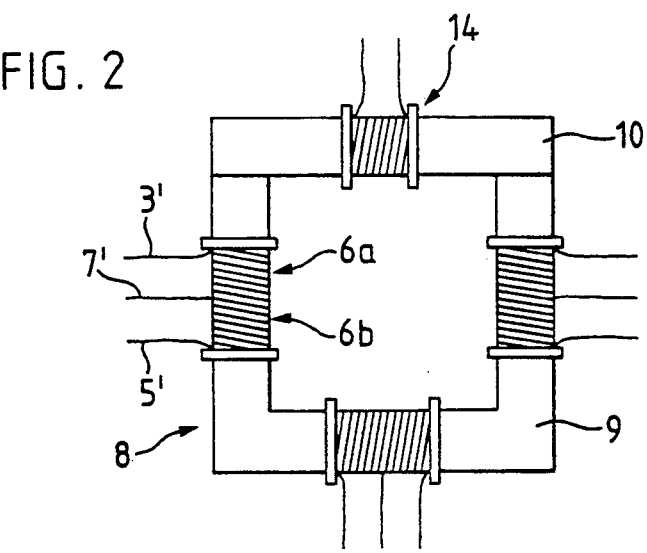
FIG. 2 shows an exemplary arrangement of inductance coils on a common magnetic core in a device according to the invention.

In FIG. 2 it is shown how all three inductance coils 6 are wound on a common magnetic core 8. Magnetic core 8 is constructed, according to the embodiment of FIG. 2, as a U-I-lamella core with U-shaped elements 9 and I-shaped elements 10 to form a closed magnetic circuit. However, this is only stated as an example and magnetic core 8 could also be formed by other elements with other shapes or as a toroidal core made from one piece. The embodiment with two parts can be seen in that each one of the inductance coils comprises three connecting leads 3', 5', 7', of which the central lead 7' corresponds to the central terminal 7, so that the two parts 6a, 6b of inductance coil 6 are located between the connecting leads 7', 5' and 3', respectively.

Moreover, an additional coil 14 may be wound on magnetic core 8 to be used as the secondary of a power supply transformer.

The winding direction of inductance coils 6 on the common magnetic core 8 is such that an ideal three-phase current flowing through the inductance coils (sinusoidal shaped currents of precisely the same intensity in all inductance coils with a phase shift of exactly 120°) induces magnetic fluxes in magnetic core 8, the total of which is equal zero.

In an embodiment of the driving means according to the invention, the inductance coils 6 and magnetic core 8 is dimensioned like a power supply transformer and adjusted to the frequency and rating of the converter. In other words, with regard to the dimensioning the inductance coils 6 on magnetic core 8 are designed as a balancing transformer in such a manner that the whole item could be used as a power transformer in a ratio of 1:1 of the phases amongst each other. Under such circumstances deviations of the currents from the ideal three-phase current induce magnetic fluxes which counteract these deviations and which make the vectorial totals of the currents of the asynchronous motor's multiphase supply essentially equal zero.

In the driving means with an converter of the kind disclosed in patent application PCT/CH89/00188, the mentioned deviations from the ideal three-phase current are mainly caused by deficiencies in the electromagnetic symmetry of the three-phase asynchronous motor and/or the connected semiconductor output stages of the converter. Hence it follows that the described embodiment of inductance coils 6 on magnetic core 8 which are connected in series between converter 1 and asynchronous motor 4 cause a correction of the deficiencies in the electromagnetic symmetry of the three-phase asynchronous motor 4 and/or the connected semiconductor output stages of converter 1. The amount of iron required for correct operation of the asynchronous motor 4 is reduced to a minimum. If asynchronous motor 4 is operated in a highly saturated and dynamical manner, the described balancing transformation in asynchronous motor 4 will ensure a consistently concentric magnetisation with a constant exploitation of the stator's iron.

By correcting the electromagnetic symmetry of the three-phase asynchronous motor and/or the connected semiconductor output stages of the converter, the stresses on the bearings of the asynchronous motor's shaft is particularly reduced in highly dynamical operation, especially the bearing stress acting vertically to the shaft, even if a multipolar asynchronous motor is concerned with, for example, four or more poles. Furthermore, lower motor time constants with high saturation are achieved by correcting the electromagnetic symmetry and reducing the iron weight of the three-phase asynchronous motor.

In other words, the magnetic core with three similar windings and with the same direction of magnetic flux constitutes a six pole which is able to balance the current from the output of an converter with the characteristics of a low impedance electric generator without increasing the internal resistance on the converter's output as in a forced current output from a current source.

On the whole, the invention enables, in an advantageous manner, the achievement of considerably higher dynamics in an asynchronous motor and the improvement of its smooth rotation qualities, in particular concerning high saturation and high dynamics.

In a further embodiment of the driving means according to the invention, which is particularly designated to protect the converter against spikes, inductance coils 6 and magnetic core 8 are constructed in such a manner that the inductance coils and the magnetic core are dimensioned equivalent to a mains filter adjusted to the frequency and rating of the spikes of the converter, in order to remove such spikes from the respective phase of the supply.

In particular the inductance coils 6, which, in comparison with the above described embodiment of the device according to the invention, are particularly designated for correcting the electromagnetic symmetry of the three-phase asynchronous motor and/or the connected semiconductor output stages of the converter, comprise a number of windings which is 10 to 20 times higher.

In a power output stage with series inductance, such a stage will generate spikes on the connected semiconductor output stages when commutating or the opening of a contact occurs. Such spikes are removed, as is commonly known, by means of recovery diodes. However, the increase of voltage theoretically takes place in time zero and the diodes are not able to follow suit infinitely fast, thus producing, despite the diodes, unacceptable spikes on the connected semiconductor output stages.

In each inductance coil the central terminal 7 is connected, via a capacitor 11, with a reference terminal 12 of converter 1 which leads to a reference pole of the internal DC supply of converter 1. Capacitor 11 delays the spikes relative to reference terminal 12. Thus a transformer with a ratio of 1:1 comes about between the two parts 6a and 6b of inductance coil 6 at the frequencies of the diverted spikes. This transformer induces in part 6a of inductance coil 6 a voltage acting in opposite direction but of the same size as the rise of the spikes in part 6b of inductance coil 6. The spikes thus transformed are applied to the reference terminal 12 of converter 1. Thus, with low losses, both the disturbing spikes are annulled and the effective rise time is prolonged. A "soft" commutation of the connected semiconductor output stages is thus achieved.

Furthermore, the achieved "soft" commutation of the connected semiconductor output stages takes place with the current's momentary values, so that the reactive load on the semiconductor output stages and the load on the respective capacitor 7 is reduced during commutation. After the commutation the effect of the inductance on the respective inductance coil 6 disappears.

Every inductance coil may, as is described in FIG. 1, have a further capacitor 13 connected in parallel. By means of this capacitor 13 the resonant frequency of inductance coil 6 and thus the time constant of the spike transformation is adjustable. In other words, by means of capacitor 13 the frequency spectrum designated as disturbing is defined, to which the above mentioned spikes transformation is applied. This allows, during commutation, adjustment of the leading edge rates of the transformed spikes.

In every inductance coil a voltage is induced in part 6a of inductance coil 6 (on the side of converter 1) which is directed in the opposite direction of and comprises the same size as any possible spikes in part 6b of inductance coil 6 (on the side of the load). Such spikes arise on the side of the load by switching processes and the like, whose disturbing and, for the semiconductor output stages, dangerous spikes are reduced with low losses in the disturbing frequency spectrum. Additionally, the effective rise time is prolonged.

On the whole, the driving means in accordance with the invention comprises, due to the combination of inductance coils 6 and capacitors 7 and 13, a low loss protective circuit for the semiconductor output stages of converter 1, which transforms the spikes from the semiconductor output stages of converter 1 to asynchronous motor 4, and, vice-versa, transforms the spikes fed to the side of the load in such a manner, that they no longer constitute a danger for the semiconductor output stages of converter 1.

The dimension of inductance coils 6 depends on the power requirements, frequency spectrum, and their purpose, either for correcting the electromagnetic symmetry of the three-phase asynchronous motor and/or the connected semiconductor output stages of converter 1 or for transforming the spikes.

The most important result in the transformation of spikes consists of securing the reliability of the static converter particularly in highly dynamic operating modes, i.e. with frequent changes in the power requirements and the direction of the energy flow (acceleration/braking) with the respective burden on the converter's recovery diodes caused by the switching processes, with low electrical losses and high efficiency of the driving means.

The most important result in the correction of the electromagnetic symmetry is the relief of the bearing during highly dynamical operation with a highly saturated asynchronous motor, thus enabling the asynchronous motor to be driven with increased dynamics.

As a result the inductance coils of the drive means according to the invention do not generate, during optimal electromagnetic symmetry of the asynchronous motor and the connected semiconductor output stages of the converter, additional internal resistance on the converter's output and, consequentially, no loss heat with correct dimensioning, so that the efficiency of the drive means according to the invention is not impaired thereby. Presently known protective circuits (snubber-networks) contain, in contrast to the drive means according to the invention, resistors which cause corresponding thermal losses.

Generally speaking, the embodiment of the invention is in no way limited to the one described above, which only constitutes an example. The man skilled in the art is well aware of many equivalent embodiments which do not exceed the scope of the invention. Amongst the equivalent embodiments those are mentioned particularly which may be used with other multiphase, in particular four- and sixphase embodiments of the asynchronous motor and other embodiments of the load.

I claim:

1. A device comprising a multi-phase load and a static converter for multi-phase supply of the load, as well as inductance coils, each allocated to a phase and wound in the same direction and with the same number of windings on a common magnetic core formed to constitute a closed magnetic circuit, characterized in that each one of the inductance coils is connected with one of the phase leads for supplying the load, the connection being made in series between the converter and the load, the inductance coils and the magnetic core being dimensioned equivalent to a mains filter adjusted to the frequency and rating of spikes of the converter, in order to remove such spikes from the respective phase of the power supply, each inductance coil comprising a central terminal which is connected, via a capacitor, to a reference terminal of the converter leading to a reference pole of the internal DC power supply of the converter, in order to transform the spikes within a ratio of −1:1 and to apply the transformed spikes to the reference terminal.

2. The device as claimed in claim 1, characterized in that a further capacitor is connected in parallel with each inductance coil, in order to adjust the resonant frequency of the inductance coil.

3. A device comprising a multi-phase load and a static converter for multi-phase supply of the load, as well as inductance coils, each allocated to a phase and wound in the same direction and with the same number of windings on a common magnetic core formed to constitute a closed magnetic circuit, characterized in that each one of the inductance coils is connected with one of the phase leads for supplying the load, the connection being made in series between the converter and the load, the inductance coils and the magnetic core being dimensioned equivalent to a supply transformer adjusted to the frequency and rating of the converter in order to balance deficiency in the electromagnetic symmetry of at least one of the multi-phase load and the converter by means of transformer-like action, an additional coil being placed on the magnetic core so as to be usable as the secondary of a supply transformer.

4. A driving arrangement comprising a multi-phase asynchronous motor and a static converter for multi-phase supply of the motor, as well as inductance coils, each allocated to a phase and wound in the same direction and with the same number of windings on a common magnetic core formed to constitute a closed magnetic circuit, characterized in that each one of the inductance coils is connected with one of the phase leads for supplying the load, the connection being made in series between the converter and the motor.

5. A device comprising a multi-phase load and a static converter for multi-phase supply of the load, as well as inductance coils, each allocated to a phase and wound in the same direction and with the same number of windings on a common magnetic core formed to constitute a closed magnetic circuit, characterized in that each one of the inductance coils is connected with one of the phase leads for supplying the load, a connection being made in series between the converter and the load, the inductance coils and the magnetic core being dimensioned equivalent to a mains filter adjusted to the frequency and rating of spikes of the converter in order to remove such spikes from the respective phase of the power supply, each inductance coil comprising a central terminal which is connected, via a capacitor, to the respective central terminal of each of the inductance coils in order to compensate an effect of such spikes on the load at the respective phase by spikes generated at the other phases.

6. The device as claimed in claim 5, characterized in that the central terminal of each one inductance coil is connected via the capacitor to a reference terminal of the converter leading to a reference pole of the internal DC power supply of the converter, in order to transform the spikes within a ratio ob $-1:1$ and to apply the transformed spikes to the reference terminal.

7. The device as claimed in claim 5, characterized in that a further capacitor is connected in parallel with each inductance coil, in order to adjust the resonant frequency of the inductance coil.

* * * * *

UNITED STATES PATENT AND TRADEMARK OFFICE
CERTIFICATE OF CORRECTION

PATENT NO.   : 5,204,596

DATED        : April 20, 1993

INVENTOR(S)  : VOET

It is certified that error appears in the above-identified patent and that said Letters Patent is hereby corrected as shown below:

On the title page:

add item --[30]   Foreign Application Priority Data
          Feb. 17, 1989   [CH]   Switzerland.....557/89-7--

Signed and Sealed this

Twenty-fourth Day of October, 1995

Attest:

Attesting Officer

BRUCE LEHMAN
Commissioner of Patents and Trademarks